United States Patent
You

(10) Patent No.: US 11,481,128 B2
(45) Date of Patent: Oct. 25, 2022

(54) STORAGE DEVICE AND OPERATING METHOD THEREOF

(71) Applicant: SK hynix Inc., Gyeonggi-do (KR)

(72) Inventor: Byoung Sung You, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 11 days.

(21) Appl. No.: 16/938,603

(22) Filed: Jul. 24, 2020

(65) Prior Publication Data

US 2021/0263647 A1 Aug. 26, 2021

(30) Foreign Application Priority Data

Feb. 25, 2020 (KR) .................. 10-2020-0023128

(51) Int. Cl.
*G06F 3/06* (2006.01)
*G06F 9/48* (2006.01)

(52) U.S. Cl.
CPC ............ *G06F 3/064* (2013.01); *G06F 3/0614* (2013.01); *G06F 3/0653* (2013.01); *G06F 3/0659* (2013.01); *G06F 3/0679* (2013.01); *G06F 9/4881* (2013.01)

(58) Field of Classification Search
None
See application file for complete search history.

(56) References Cited

U.S. PATENT DOCUMENTS

| 6,704,835 B1* | 3/2004 | Garner | G06F 12/0875 711/103 |
| 2013/0138912 A1* | 5/2013 | Bux | G06F 3/061 711/170 |
| 2014/0101372 A1* | 4/2014 | Jung | G11C 16/26 711/103 |
| 2015/0355845 A1* | 12/2015 | Lee | G06F 3/0616 711/103 |
| 2020/0064898 A1* | 2/2020 | Shen | G06F 1/08 |
| 2020/0110708 A1* | 4/2020 | Ma | G06F 11/1068 |

FOREIGN PATENT DOCUMENTS

| KR | 10-2016-0042287 | 4/2016 |
| KR | 10-2016-0049200 | 5/2016 |
| KR | 10-2019-0073017 | 6/2019 |

* cited by examiner

*Primary Examiner* — Charles Rones
*Assistant Examiner* — Jonah C Krieger
(74) *Attorney, Agent, or Firm* — IP & T Group LLP

(57) ABSTRACT

A memory device includes a plurality of memory blocks, a read count storage, and a read reclaim processor. The read count storage stores read count information including a read count of each of the plurality of memory blocks. The read reclaim processor provides a memory controller with a status read response including a status code representing a priority order of a read reclaim operation on a target block, in response to a status read command received from the memory controller.

20 Claims, 8 Drawing Sheets

| BLK1 | BLK2 | BLK3 | ... | BLKn |
|---|---|---|---|---|
| RD_Count1 | RD_Count2 | RD_Count3 | ... | RD_Countn |

STATUS READ RESPONSE

| READY/BUSY INFORMATION | PASS/FAIL INFORMATION | STATUS CODE |
|---|---|---|

| RD_Count(x) | Status | Status Code |
|---|---|---|
| Th2≤x | S3(in danger) | 10 |
| Th1≤x<Th2 | S2(at stake) | 01 |
| x<Th1 | S1(safe) | 00 |

STORAGE DEVICE AND OPERATING METHOD THEREOF

CROSS-REFERENCE TO RELATED APPLICATION

The present application claims priority under 35 U.S.C. § 119(a) to Korean patent application number 10-2020-0023128, filed on Feb. 25, 2020, which is incorporated herein by reference in its entirety.

BACKGROUND

Field of Invention

The present disclosure generally relates to an electronic device, and more particularly, to a storage device and an operating method thereof.

Description of Related Art

A storage device stores data under the control of a host device such as a computer or a smart phone. A storage device may include a memory device for storing data and a memory controller for controlling the memory device. A memory device may be a volatile memory device or a nonvolatile memory device.

A volatile memory device stores data only when power is supplied; stored data disappears when the supply of power is interrupted. Examples of volatile memory devices include a Static Random Access Memory (SRAM), a Dynamic Random Access Memory (DRAM), and the like.

A nonvolatile memory device continues to store data even when the supply of power is interrupted. Examples of nonvolatile memory devices include a Read Only Memory (ROM), a Programmable ROM (PROM), an Electrically Programmable ROM (EPROM), an Electrically Erasable ROM (EEROM), a flash memory, and the like.

SUMMARY

Embodiments provide a storage device having improved read reclaim performance and an operating method thereof.

In accordance with an aspect of the present disclosure, there is provided a memory device including: a plurality of memory blocks; a read count storage configured to store read count information including a read count of each of the plurality of memory blocks; and a read reclaim processor configured to provide a memory controller with a status read response including a status code representing a priority order of a read reclaim operation on a target block, in response to a status read command received from the memory controller.

In accordance with another aspect of the present disclosure, there is provided a method for operating a memory device including a plurality of memory blocks, the method including: performing a read operation on a target block among the plurality of memory blocks in response to a read command received from a memory controller; and providing the memory controller with a status read response including a status code representing a priority order of a read reclaim operation on the target block, in response to a status read command received from the memory controller.

In accordance with still another aspect of the present disclosure, there is provided a storage device including: a memory device including a plurality of memory blocks; and a memory controller configured to control the memory device to perform a read operation on a target block among the plurality of memory blocks, and receive, from the memory device, a status read response including a status code representing a priority order of a read reclaim operation of the target block.

BRIEF DESCRIPTION OF THE DRAWINGS

Example embodiments are described more fully hereinafter with reference to the accompanying drawings; however, features and aspects of the present invention may be configured and/or arranged differently than disclosed herein. Thus, the present invention is not limited to or by any of the embodiments set forth herein. Rather, these embodiments are provided so that this disclosure is thorough and complete, and fully conveys the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Specific structural and functional description provided herein is merely for the purpose of describing embodiments according to the present invention. Embodiments of the present invention can be implemented in various forms and ways. Thus, as the present invention is not limited to or by any of the embodiments set forth herein. Also, throughout the specification, reference to "an embodiment," "another embodiment" or the like is not necessarily to only one embodiment, and different references to any such phrase are not necessarily to the same embodiment(s).

Figure 1:
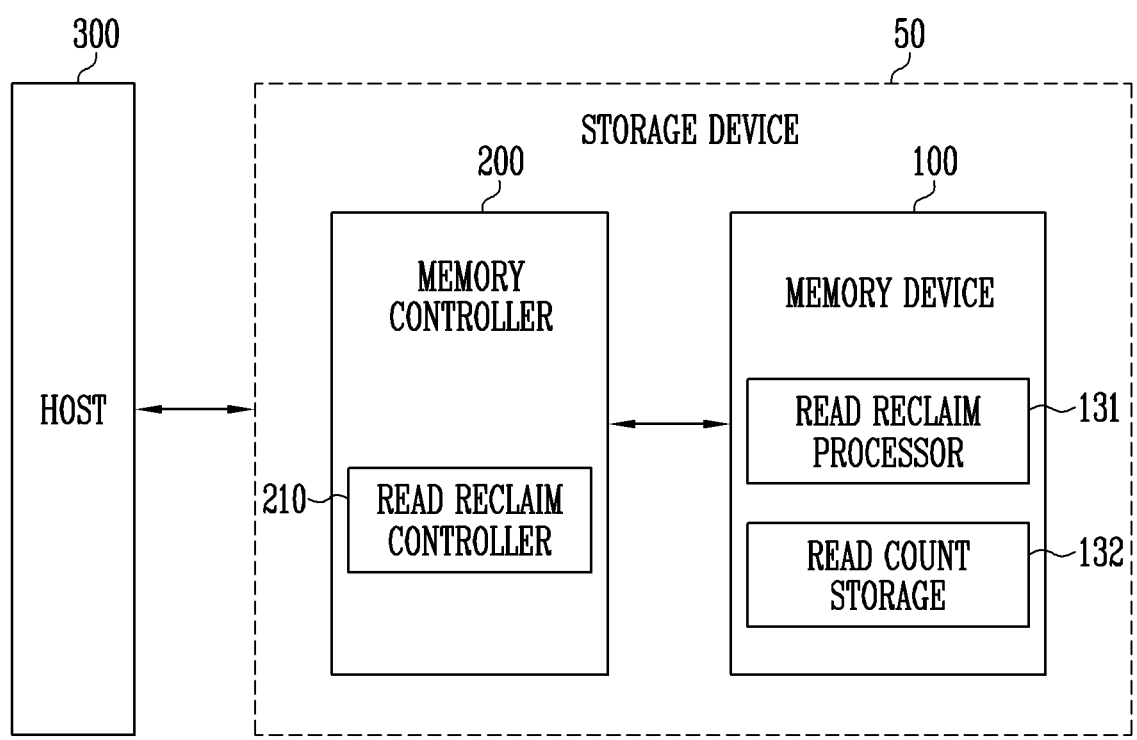
FIG. 1 is a diagram illustrating a storage device in accordance with an embodiment of the present disclosure.

FIG. 1 is a diagram illustrating a storage device in accordance with an embodiment of the present disclosure.

Referring to FIG. 1, the storage device 50 may include a memory device 100 and a memory controller 200 configured to control the memory device 100. The storage device 50 may store data under the control of a host 300, such as a mobile phone, a smart phone, an MP3 player, a laptop computer, a desktop computer, a game console, a TV, a tablet PC or an in-vehicle infotainment.

The storage device 50 may be configured as any of various types of storage devices according to a host interface that is a communication scheme with the host 300. For example, the storage device 50 may be implemented as a Solid State Drive (SSD), a Multi-Media Card (MMC), an Embedded MMC (eMMC), a Reduced Size MMC (RS-MMC), a micro-MMC (micro-MMC), a Secure Digital (SD) card, a mini-SD card, a micro-SD card, a Universal Serial Bus (USB) storage device, a Universal Flash Storage (UFS) device, a Compact Flash (CF) card, a Smart Media Card (SMC), and/or a memory stick.

The storage device 50 may be manufactured as any of various kinds of package types. For example, the storage device 50 may be manufactured as a Package-On-Package (POP), a System-In-Package (SIP), a System-On-Chip (SOC), a Multi-Chip Package (MCP), a Chip-On-Board (COB), a Wafer-level Fabricated Package (WFP), and/or a Wafer-level Stack Package (WSP).

The memory device 100 may store data. The memory device 100 operates under the control of the memory controller 200. The memory device 100 may include a memory cell array including a plurality of memory cells for storing data.

Each of the memory cells may be configured as a Single Level Cell (SLC) storing one data bit, a Multi-Level Cell (MLC) storing two data bits, a Triple Level Cell (TLC) storing three data bits, or a Quad Level Cell (QLC) storing four data bits.

The memory cell array may include a plurality of memory blocks, each of which may include a plurality of memory cells. One memory block may include a plurality of pages. In an embodiment, the page may be a unit for storing data in the memory device 100 or reading data stored in the memory device 100.

The memory block may be a unit for erasing data. In an embodiment, the memory device 100 may be a Double Data Rate Synchronous Dynamic Random Access Memory (DDR SDRAM), a Low Power Double Data Rate 4 (LPDDR4) SDRAM, a Graphics Double Data Rate (GDDR) SRAM, a Low Power DDR (LPDDR), a Rambus Dynamic Random Access Memory (RDRAM), a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (STT-RAM), or the like. In this specification, by way of example, features and aspects of the invention are described in the context in which the memory device 100 is a NAND flash memory.

The memory device 100 receives a command and an address from the memory controller 200 and accesses an area selected by the address in the memory cell array. That is, the memory device 100 may perform an operation instructed by the command on the area selected by the address. For example, the memory device 100 may perform a write (program) operation, a read operation, and an erase operation. In the program operation, the memory device 100 may program data in the area selected by the address. In the read operation, the memory device 100 may read data from the area selected by the address. In the erase operation, the memory device 100 may erase data stored in the area selected by the address.

In an embodiment, the memory device 100 may include a read reclaim processor 131 and a read count storage 132.

The read reclaim processor 131 may provide the memory controller 200 with a status read response including a status code in response to a status read command received from the memory controller 200. The status read command may be for checking an operating status of the memory device. The status code may indicate a priority order of a read reclaim operation on a target block on which a read operation is performed. That is, the status code may indicate whether the read reclaim operation is to be performed on the target block, and if so, how it is to be performed. The read reclaim operation may include copying data stored in the target block to another block. Alternatively, the read reclaim operation may include moving data stored in the target block to another block through garbage collection.

A plurality of memory blocks may store read count information. In an embodiment, each of the memory blocks may store a read count that indicates the number of times a read operation has been performed on that memory block. In an embodiment, the read count information may be stored in a meta area of each of the plurality of memory blocks. In another embodiment, the read count information may be stored in system blocks among the plurality of memory blocks.

The read reclaim processor 131 may load read count information stored in a plurality of memory blocks to the read count storage 132, when power is applied to the memory device 100.

The read reclaim processor 131 may update the read count information loaded to the read count storage 132 in response to a read command received from the memory controller 200. For example, the read reclaim processor 131 may update a read count of a target block on which a read operation is performed according to the read command.

The read reclaim processor 131 may determine a status code, based on the result of a comparison of the read count of the target block and at least one threshold count. In an embodiment, the status code may represent one of first to third status codes. The first status code may indicate that a read reclaim operation on the target block is unnecessary. The second status code may indicate that the read reclaim operation is to be performed as a background operation. The third status code may indicate that the read reclaim operation is to be performed as a foreground operation. The number of status codes is not limited to the three described above.

The read reclaim processor 131 may again store, in the plurality of memory blocks, the read count information loaded to the read count storage 132 before the power supplied to the memory device 100 is interrupted.

The read count storage 132 may store read count information read from a plurality of memory blocks. Whenever a read operation is performed on any of the plurality of memory blocks, the read count information stored in the read count storage 132 may be updated. The updated read count information may be again stored in the plurality of memory blocks before the power supplied to the memory device 100 is interrupted.

The memory controller 200 may control overall operation of the storage device 50.

When power is applied to the storage device 50, the memory controller 200 may execute firmware (FW). When the memory device 100 is a flash memory device, the memory controller 200 may execute FW such as a Flash Translation Layer (FTL) for controlling communication between the host 300 and the memory device 100.

In an embodiment, the memory controller 200 may receive data and a Logical Block Address (LBA) from the host 300, and translate the LBA into a Physical Block Address (PBA) representing addresses of memory cells in the memory device 100, in which data is to be stored.

The memory controller 200 may control the memory device 100 to perform a program operation, a read operation, an erase operation, or the like in response to a request from the host 300. In the program operation, the memory controller 200 may provide a program command, a PBA, and data to the memory device 100. In the read operation, the memory controller 200 may provide a read command and a PBA to the memory device 100. In the erase operation, the memory controller 200 may provide an erase command and a PBA to the memory device 100.

In an embodiment, the memory controller 200 may autonomously generate a command, an address, and data in the absence of a request from the host 300, and transmit the command, the address, and the data to the memory device 100. For example, the memory controller 200 may provide the autonomously-generated command, the address, and the data to the memory device 100 to perform background operations such as wear leveling and garbage collection.

In an embodiment, the memory controller 200 may control at least two memory devices 100. The memory controller 200 may control the memory devices according to an interleaving scheme so as to improve operational performance. The interleaving scheme may be an operating scheme that allows each of at least two memory devices 100 to perform at least a portion of an operation at the same time.

In an embodiment, the memory controller 200 may include a read reclaim controller 210.

The read reclaim controller 210 may provide a status read command to the memory device 100. The status read command may be for checking an operating status of the memory device 100. The read reclaim controller 210 may receive a status read response to the status read command from the memory device 100. The status read response may include a status code representing a priority order of a read reclaim operation of a target block on which a read operation is performed.

The read reclaim controller 210 may control the memory device 100 to perform the read reclaim operation on the target block based on the status code.

Specifically, when the status code is a first status code, the read reclaim controller 210 may control the memory device 100 to not perform the read reclaim operation on the target block.

When the status code is a second status code, the read reclaim controller 210 may control the memory device to perform the read reclaim operation on the target block as a background operation. That is, the read reclaim controller 210 may control the memory device 100 to perform the read reclaim operation on the target block when the memory device 100 is in an idle state. In the idle state, the memory device 100 does not perform any operation according to a request from the host 300.

When the status code is a third status code, the read reclaim controller 210 may control the memory device 100 to perform the read reclaim operation as a foreground operation. That is, the read reclaim controller 210 may control the memory device 100 to preferentially perform the read reclaim operation on the target block, with respect to another read, program or erase operation.

The host 300 may communicate with the storage device 50, using at least one of various communication protocols, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a Non-Volatile Memory express (NVMe), a universal flash storage (UFS), a Secure Digital (SD), a Multi-Media Card (MMC), an embedded MMC (eMMC), a Dual In-line Memory Module (DIMM), a Registered DIMM (RDIMM), and/or a Load Reduced DIMM (LRDIMM).

Figure 2:
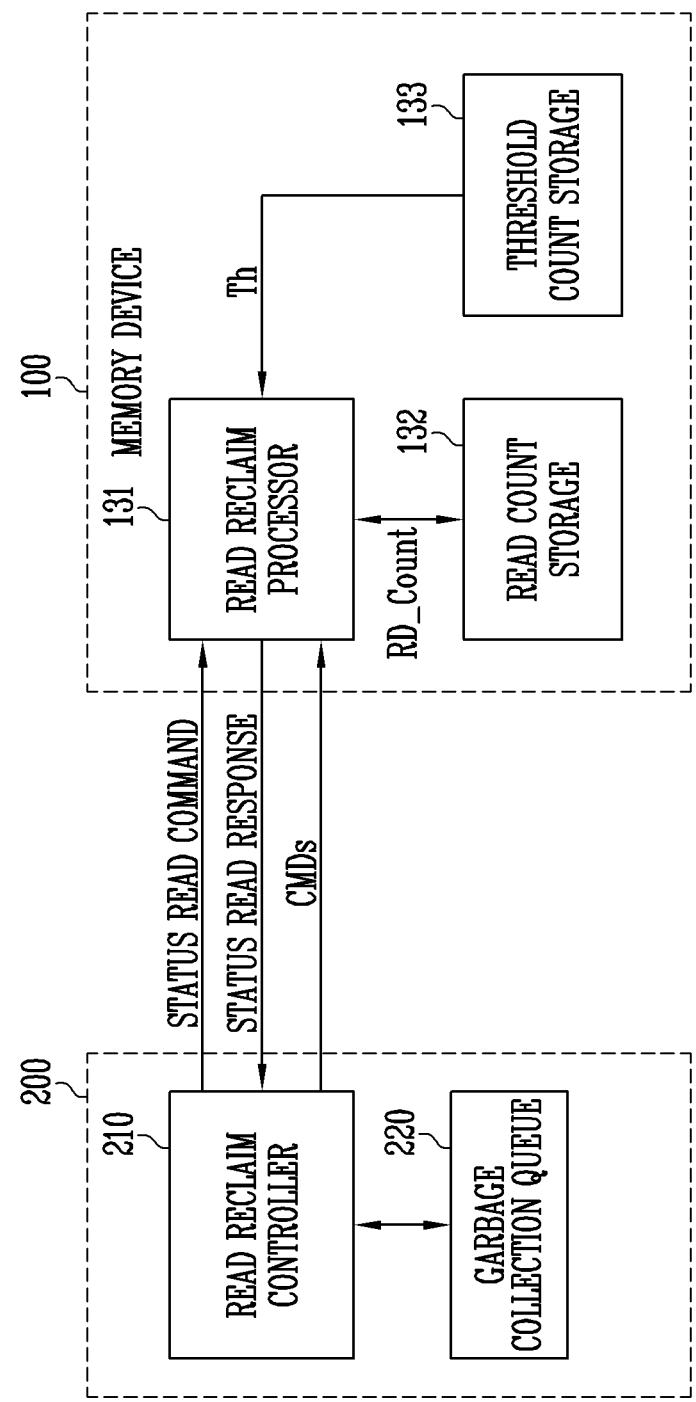
FIG. 2 is a diagram illustrating a configuration and an operation of a storage device, such as that shown in FIG. 1.

FIG. 2 is a diagram illustrating a configuration and an operation of the storage device shown in FIG. 1.

Referring to FIG. 2, the storage device may include a memory device 100 and a memory controller 200. The memory device 100 may include a read reclaim processor 131, a read count storage 132, and a threshold count storage 133. The memory controller 200 may include a read reclaim controller 210 and a garbage collection queue 220.

The read reclaim processor 131 may provide the read reclaim controller 210 with a status read response including a status code in response to a status read command received from the read reclaim controller 210. The status read command may be for checking an operating status of the memory device 100. The status code may represent a priority order of a read reclaim operation on a target block on which a read operation is performed.

The read reclaim processor 131 may receive at least one threshold count Th from the threshold count storage 133. The read reclaim processor 131 may receive a read count RD_Count of the target block from the read count storage 132. RD_Count for a particular block, e.g., a target block, indicates how many times a read operation has been performed on that block.

The read reclaim processor 131 may determine a status code, based on the result of a comparison of the read count RD_Count of the target block and the at least one threshold count Th.

In an embodiment, the status code may be any of three status codes, i.e., first to third status codes, which indicate various levels of priority in performing a read reclaim operation. However, the present invention is not limited to any specific number of status codes. When the read count RD_Count of the target block is smaller than a first threshold count, the status code may be the first status code. When the read count RD_Count of the target block is greater than or equal to the first threshold count and is smaller than a second threshold count, the status code may be the second status code. When the read count RD_Count of the target block is greater than or equal to the second threshold count, the status code may be the third status code.

In an embodiment, the first status code may indicate that the read reclaim operation on the target block is unnecessary. The second status code may indicate that performance of the read reclaim operation is to be performed as a background operation. The third status code may indicate that performance of the read reclaim operation is to be performed as a foreground operation.

The read reclaim processor 131 may provide the read reclaim controller 210 with the status read response including the determined status code.

The read reclaim processor 131 may load read count information stored in a plurality of memory blocks to the read count storage 132, when power is applied to the memory device 100. The read count information may include a read count of each of the plurality of memory blocks.

The read reclaim processor 131 may update the read count information loaded to the read count storage 132 in response to a read command received from the memory controller 200. For example, the read claim processor 131 may update a read count of a target block, which is included in the read count information in response to the read command. The target block may be a memory block on which a read operation is performed according to the read command.

The read reclaim processor 131 may again store, in the plurality of memory blocks, the read count information loaded to the read count storage 132 before the power supplied to the memory device 100 is interrupted.

The read count storage 132 may store read count information loaded from a plurality of memory blocks. Whenever a read operation is performed on any of the plurality of memory blocks, the read count information stored in the read count storage 132 may be updated. The updated read count information may be again stored in the plurality of memory blocks before the power supplied to the memory device 100 is interrupted.

The threshold count storage 133 may store at least one threshold count Th. Each threshold count Th may be set when the storage device is manufactured. In another embodiment, each threshold count Th may be changed from its factory set default value depending on a setting command of the memory controller 200.

The read reclaim controller 210 may provide a status read command to the read reclaim processor 131. The status read command may be for checking an operating status of the memory device 100. The read reclaim controller 210 may receive a status read response to the status read command from the read reclaim processor 131. The status read response may include a status code representing a priority order, e.g., the relative priority, of a read reclaim operation of a target block on which a read operation is performed.

The read reclaim controller 210 may control the memory device 100 to perform the read reclaim operation on the target block based on the status code.

Specifically, when the status code is the first status code, the read reclaim controller 210 may not generate a command for the read reclaim operation on the target block. Thus, in this case, the read reclaim operation is not performed on the target block.

When the status code is the second status code, the read reclaim controller 210 may generate commands for the read reclaim operation, and store the generated commands in the garbage collection queue 220. The read reclaim controller 210 may provide the memory device 100 with commands for the read reclaim operation, which are queued in the garbage collection queue 220, when the memory device 100 is in an idle state.

When the status code is the third status code, the read reclaim controller 210 may preferentially provide commands for the read reclaim operation to the memory device 100, as compared with commands generated before the commands for the read reclaim operation.

Figure 3:
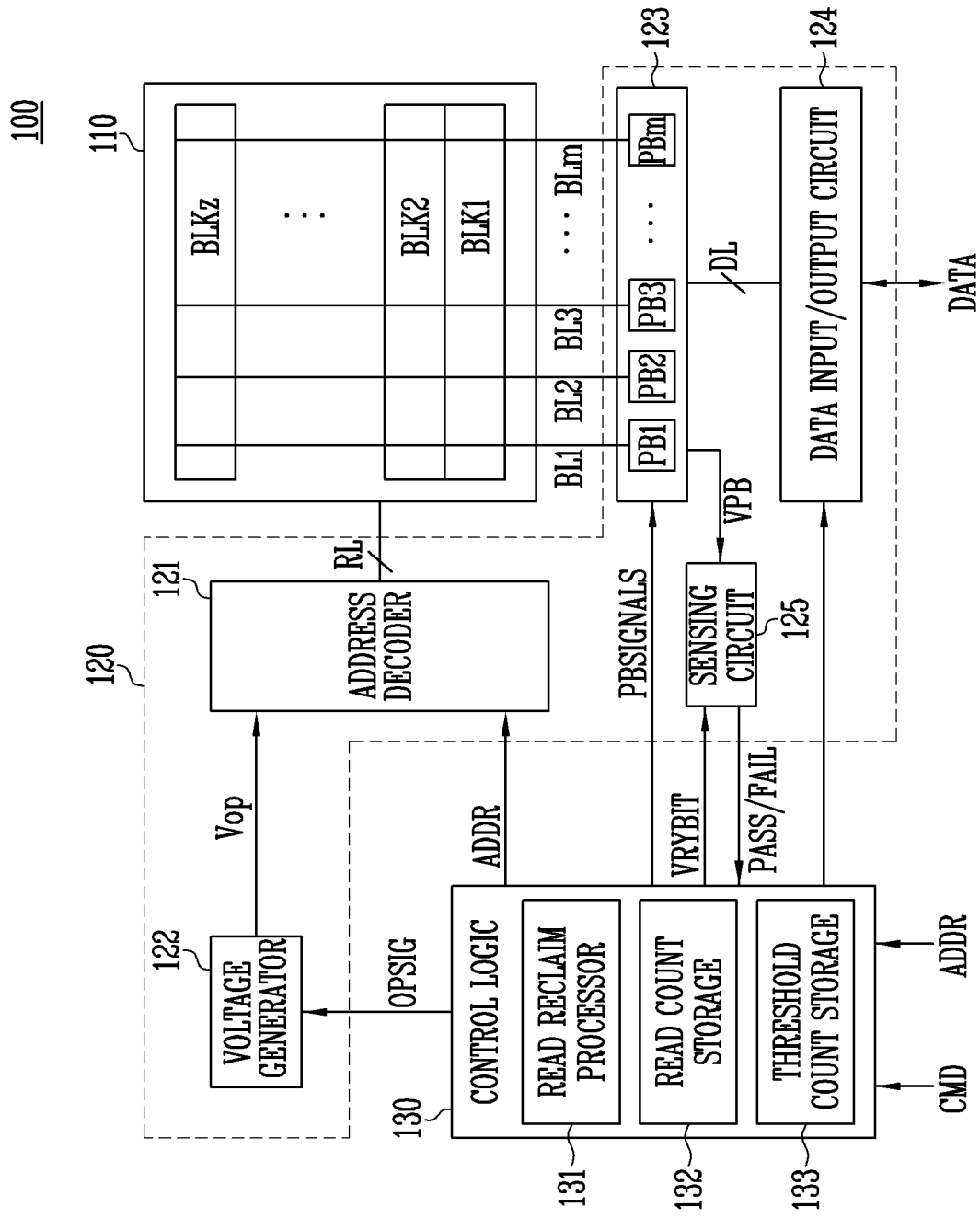
FIG. 3 is a diagram illustrating a structure of a memory device, such as that shown in FIG. 1.

FIG. 3 is a diagram illustrating a structure of the memory device shown in FIG. 1.

Referring to FIG. 3, the memory device 100 may include a memory cell array 100, a peripheral circuit 120, and control logic 130.

The memory cell array 110 includes a plurality of memory blocks BLK1 to BLKz, which are coupled to an address decoder 121 through row lines RL. The plurality of memory blocks BLK1 to BLKz are coupled to a read/write circuit 123 through bit lines BL1 to BLm. Each of the plurality of memory blocks BLK1 to BLKz includes a plurality of memory cells. In an embodiment, the plurality of memory cells may be nonvolatile memory cells. Memory cells coupled to the same word line among the plurality of memory cells may be defined as one physical page. That is, the memory cell array 110 may be configured with a plurality of physical pages. In accordance with an embodiment of the present disclosure, each of the plurality of memory blocks BLK1 to BLKz in the memory cell array 110 may include a plurality of dummy cells. One or more dummy cells may be coupled in series between a drain select transistor and memory cells and between a source select transistor and the memory cells.

Each of the memory cells of the memory device may be configured as a Single Level Cell (SLC) storing one data bit, a Multi-Level Cell (MLC) storing two data bits, a Triple Level Cell (TLC) storing three data bits, or a Quad Level Cell (QLC) storing four data bits.

The peripheral circuit 120 may include the address decoder 121, a voltage generator 122, the read/write circuit 123, a data input/output circuit 124, and a sensing circuit 125.

The peripheral circuit 120 drives the memory cell array 110. For example, the peripheral circuit 120 may drive the memory cell array 110 to perform a program operation, a read operation, and an erase operation.

The address decoder 121 is coupled to the memory cell array 110 through the row lines RL. The row lines RL may include drain select lines, word lines, source select lines, and a common source line. In accordance with an embodiment of the present disclosure, the word lines may include normal word lines and dummy word lines. In accordance with an embodiment of the present disclosure, the row lines RL may further include a pipe select line.

The address decoder 121 may operate under the control of the control logic 130. The address decoder 121 receives an address ADDR from the control logic 130.

The address decoder 121 may decode a block address in the received address ADDR. The address decoder 121 selects at least one memory block among the memory blocks BLK1 to BLKz according to the decoded block address. The address decoder 121 may decode a row address in the received address ADDR. The address decoder 121 may select at least one word line among word lines of a selected memory block according to the decoded row address. The address decoder 121 may apply an operating voltage Vop supplied from the voltage generator 122 to the selected word line.

In a program operation, the address decoder 121 may apply a program voltage to the selected word line, and apply a pass voltage having a level lower than that of the program voltage to unselected word lines. In a program verify operation, the address decoder 121 may apply a verify voltage to the selected word line, and apply a verify pass voltage having a level higher than that of the verify voltage to the unselected word lines.

In a read operation, the address decoder 121 may apply a read voltage to the selected word line, and apply a read pass voltage having a level higher than that of the read voltage to the unselected word lines.

In accordance with an embodiment of the present disclosure, an erase operation of the memory device 100 is performed in units of memory blocks. In an erase operation, the address ADDR input to the memory device 100 includes a block address. The address decoder 121 may decode the block address and select at least memory block according to the decoded block address. In the erase operation, the address decoder 121 may apply a ground voltage to word lines coupled to the selected memory block.

In accordance with an embodiment of the present disclosure, the address decoder 121 may decode a column address in the address ADDR transmitted thereto. The decoded column address may be transmitted to the read/write circuit 123. In an example, the address decoder 121 may include components such as a row decoder, a column decoder, and an address buffer.

The voltage generator 122 may generate a plurality of operating voltages Vop by using an external power voltage supplied to the memory device 100. The voltage generator 122 operates under the control of the control logic 130.

In an embodiment, the voltage generator 122 may generate an internal power voltage by regulating the external power voltage. The internal power voltage generated by the voltage generator 122 is used as an operation voltage of the memory device 100.

In an embodiment, the voltage generator 122 may generate a plurality of operating voltages Vop by using the external power voltage or the internal power voltage. The voltage generator 122 may generate various voltages required by the memory device 100. For example, the voltage generator 122 may generate a plurality of erase voltages, a plurality of program voltages, a plurality of pass voltages, a plurality of select read voltages, and a plurality of unselect read voltages.

In order to generate a plurality of operating voltages Vop having various voltage levels, the voltage generator 122 may include a plurality of pumping capacitors for receiving the internal power voltage, and generate the plurality of operating voltages Vop by selectively activating the plurality of pumping capacitors under the control of the control logic 130.

The plurality of generated operating voltages Vop may be supplied to the memory cell array 110 by the address decoder 121.

The read/write circuit 123 includes first to mth page buffers PB1 to PBm, which are coupled to the memory cell array 110 through the first to mth bit lines BL1 to BLm, respectively. The first to mth page buffers PB1 to PBm operate under the control of the control logic 130.

The first to mth page buffers PB1 to PBm communicate data DATA with the data input/output circuit 124. In a program operation, the first to mth page buffers PB1 to PBm receive data DATA to be stored through the data input/output circuit 124 and data lines DL.

In a program operation, the first to mth page buffers PB1 to PBm may transfer, to selected memory cells through the bit lines BL1 to BLm, data DATA received through the data input/output circuit 124 when a program pulse is applied to a selected word line. The memory cells of the selected memory cells are programmed according to the transferred data DATA. A memory cell coupled to a bit line through which a program allow voltage (e.g., a ground voltage) is applied may have an increased threshold voltage. A threshold voltage of a memory cell coupled to a bit line through which a program inhibit voltage (e.g., a power voltage) is applied may be maintained. In a program verify operation, the first to mth page buffers PB1 to PBm read data DATA stored in the selected memory cells from the selected memory cells through the bit lines BL1 to BLm.

In a read operation, the read/write circuit 123 may read data DATA from memory cells of a selected page through the bit lines BL, and store the read data DATA in the first to mth page buffers PB1 to PBm.

In an erase operation, the read/write circuit 123 may float the bit lines BL. In an embodiment, the read/write circuit 123 may include a column select circuit.

The data input/output circuit 124 is coupled to the first to mth page buffers PB1 to PBm through the data lines DL. The data input/output circuit 124 operates under the control of the control logic 130.

The data input/output circuit 124 may include a plurality of input/output buffers (not shown) that receive input data DATA. In a program operation, the data input/output circuit 124 may receive data DATA to be stored from an external controller (not shown). In a read operation, the data input/output circuit 124 outputs, to the external controller, data transmitted from the first to mth page buffers PB1 to PBm included in the read/write circuit 123.

In a read operation or verify operation, the sensing circuit 125 may generate a reference current in response to an allow bit VRYBIT signal generated by the control logic 130, and output a pass signal or fail signal to the control logic 130 by comparing a sensing voltage VPB received from the read/write circuit 123 and a reference voltage generated by the reference current.

The control logic 130 may be coupled to the address decoder 121, the voltage generator 122, the read/write circuit 123, the data input/output circuit 124, and the sensing circuit 125. The control logic 130 may control overall operation of the memory device 100. The control logic 130 may operate in response to a command CMD transferred from an external device.

The control logic 130 may control the peripheral circuit 120 by generating several signals in response to a command CMD and an address ADDR. For example, the control logic 130 may generate an operation signal OPSIG, a row address RADD, a read/write circuit control signal PBSIGNALS, and an allow bit VRYBIT in response to the command CMD and the address ADDR. The control logic 130 may output the operation signal OPSIG to the voltage generator 122, output the row address RADD to the address decoder 121, output the read/write circuit control signal PBSIGNALS to the read/write circuit 123, and output the allow bit VRYBIT to the sensing circuit 125. Also, the control logic 130 may determine whether the verify operation has passed or failed in response to the pass or fail signal PASS/FAIL output by the sensing circuit 125.

In an embodiment, the control logic 130 may include the read reclaim processor 131, the read count storage 132, and the threshold count storage 133, which are described with reference to FIG. 2. In various embodiments, the read count storage 132 and the threshold count storage 133 may be located outside of the control logic 130. The read count storage 132 and the threshold count storage 133 may include a register circuit.

Figure 4:
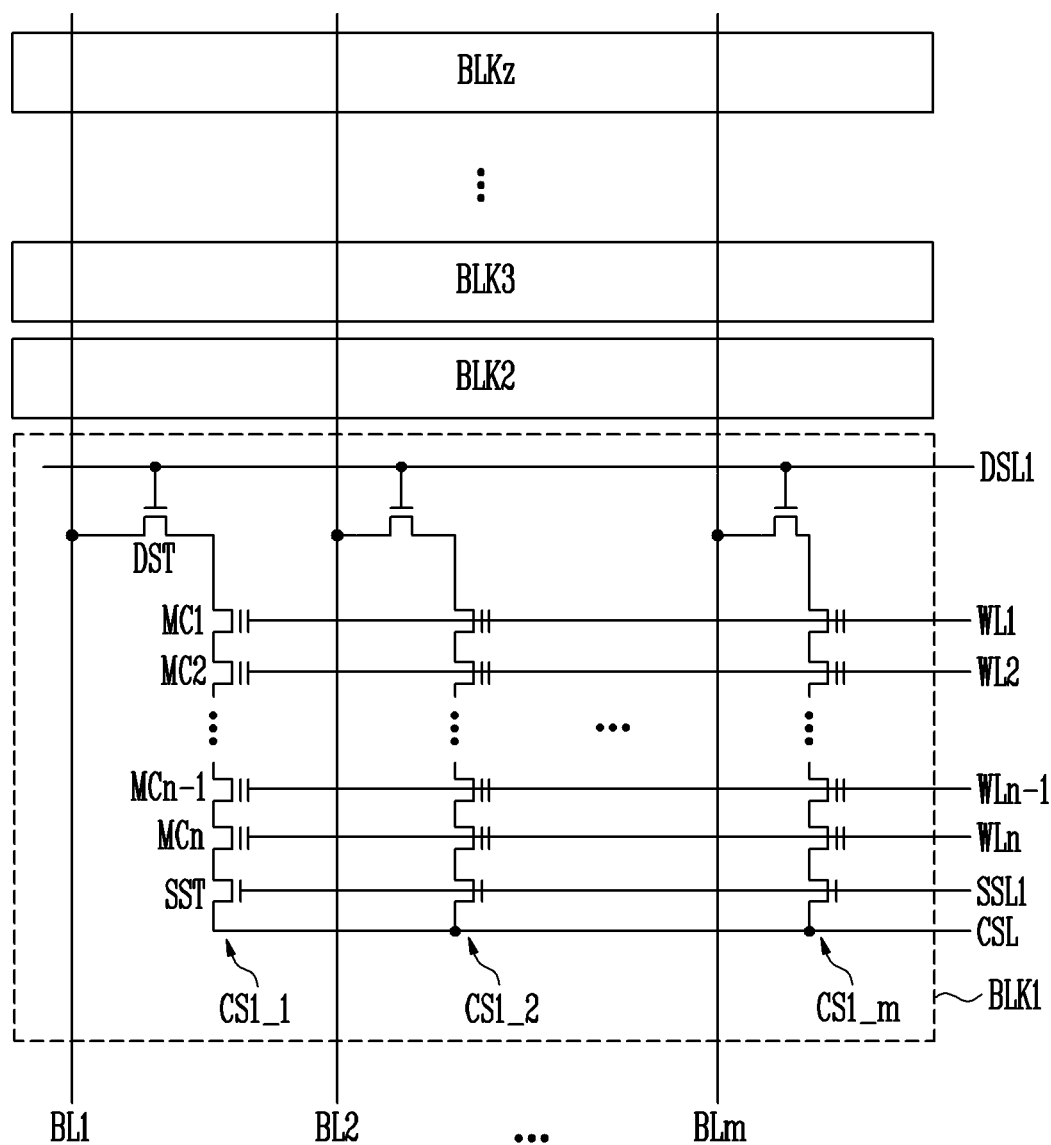
FIG. 4 is a diagram illustrating a memory cell array, such as that shown in FIG. 3.

FIG. 4 is a diagram illustrating the memory cell array shown in FIG. 3.

Referring to FIG. 4, first to zth memory blocks BLK1 to BLKz are commonly coupled to the first to mth bit lines BL1 to BLm. In FIG. 4, for clarity, components included in the first memory block BLK1 among the plurality of memory blocks BLK1 to BLKz are illustrated, and components included in each of the other memory blocks BLK2 to BLKz are omitted. It will be understood that each of the other memory blocks BLK2 to BLKz is configured identically to the first memory block BLK1.

The memory block BLK1 may include a plurality of cell strings CS1_1 to CS1_m (m is a positive integer). First to mth cell strings CS1_1 to CS1_m are respectively coupled to the first to mth bit lines BL1 to BLm. Each of the first to mth cell strings CS1_1 to CS1_m includes a drain select transistor DST, a plurality of memory cells MC1 to MCn (n is a positive integer) coupled in series, and a source select transistor SST.

A gate terminal of the drain select transistor DST included in each of the first to mth cell strings CS1_1 to CS1_m is coupled to a drain select line DSL1. Gate terminals of first to nth memory cells MC1 to MCn included in each of the first to mth cell strings CS1_1 to CS1_m are respectively coupled to first to nth word lines WL1 to WLn. A gate terminal of the source select transistor SST included in each of the first to mth cell strings CS1_1 to CS1_m is coupled to a source select line SSL1.

For clarity, FIG. 4 illustrates a structure of the first cell string CS1_1 among the plurality of cell strings CS1_1 to CS1_m. However, it will be understood that each of the other cell strings CS1_2 to CS1_m is configured identically to the first cell string CS1_1.

A drain terminal of the drain select transistor DST in the first cell string CS1_1 is coupled to the first bit line BL1. A source terminal of the drain select transistor DST in the first cell string CS1_1 is coupled to a drain terminal of the first memory cell MC1 in the first cell string CS1_1. The first to nth memory cells MC1 to MCn are coupled in series. A drain terminal of the source select transistor SST included in the first cell string CS1_1 is coupled to a source terminal of the nth memory cell MCn in the first cell string CS1_1. A source terminal of the source select transistor SST in the first cell string CS1_1 is coupled to a common source line CSL. In an embodiment, the common source line CSL may be commonly coupled to the first to zth memory blocks BLK1 to BLKz.

The drain select line DSL1, the first to nth word lines WL1 to WLn, and the source select line SSL1 are included in the row lines RL shown in FIG. 3. The drain select line DSL1, the first to nth word lines WL1 to WLn, and the source select line SSL1 are controlled by the address decoder 121 shown in FIG. 3. The common source line CSL may be controlled by the control logic 130 shown in FIG. 3. The first to mth bit lines BL1 to BLm are controlled by the read/write circuit 123 shown in FIG. 3.

Figures 5, 6:
FIG. 5 is a diagram illustrating read count information, such as that shown in FIG. 2.
FIG. 6 is a diagram illustrating a status read response, such as that shown in FIG. 2.

FIG. 5 is a diagram illustrating the read count information shown in FIG. 2.

Referring to FIG. 5, the read count information may include read counts (RD_Count1 to RD_Countn) of a plurality of memory blocks (BLK1 to BLKn), respectively. In an embodiment, the read count information for each memory block may be stored in a meta area of the corresponding memory block. In another embodiment, the read count information may be stored in system blocks among the plurality of memory blocks.

After power is supplied to the memory device 100, the read count information stored in the plurality of memory blocks may be loaded to the read count storage 132. Whenever a read operation is performed on any of the plurality of memory blocks BLK1 to BLKn, the read count information in the read count storage 132 may be updated. In particular, the read count of the memory block just read may be incremented. Then, the read count information in the read count storage 132 may be again stored in the plurality of memory blocks before the power applied to the memory device 100 is interrupted.

In this manner, a read count may be maintained and managed for each memory block.

FIG. 6 is a diagram illustrating the status read response shown in FIG. 2.

Referring to FIGS. 2 and 6, the memory device 100 may provide a status read response to the memory controller 200 in response to a status read command received from the memory controller 200. The status read response may include ready/busy information, pass/fail information, and a status code.

The ready/busy information may represent a busy status in which the memory device 100 is performing an operation according to a command received from the memory controller 200 or a ready status in which the memory device is available to perform an operation in response to a new command received from the memory controller 200.

The pass/fail information may represent whether a program operation or erase operation that the memory device 100 is performing according to a command received from the memory controller 200 has passed or failed.

The status code may indicate a priority order of a read reclaim operation on a target block on which a read operation is performed according to a read command received from the memory controller 200.

In an embodiment, the status code may represent one of first to third status codes. The priority of the read reclaim operation may become higher from the first status code to the third status code. The present invention, however, is not limited to any particular number of status codes.

In an embodiment, the status code may be determined based on the result of a comparison of a read count RD_Count x of the target block and at least one threshold count Th.

For example, when the read count x of the target block is smaller than a first threshold count Th1, the status code may be the first status code. When the read count x is greater than or equal to the first threshold count Th and is smaller than a second threshold count Th2, the status code may be the second status code. When the read count x is greater than or equal to the second threshold count Th2, the status code may be the third status code.

The first status code may represent a safe status S1 indicating that the read reclaim operation on the target block is unnecessary. The second status code may represent a risky status S2 indicating that performance of the read reclaim operation is requested to be performed as a background operation. The third status code may represent a dangerous status S3 indicating that performance of the read reclaim operation is requested to be performed as a foreground operation.

In an embodiment, a value of the first status code may be 00. A value of the second status code may be 01. A value of the third status code may be 10. A value of the status code may be determined as a combination of field values of a specific position among field values constituting the status read response. For example, when the status read response is configured with field values of <0:7> bits, the value of the status code may be determined as a combination of field value <0> and field value <3>. The value of the status code and the method for determining the same are not limited to this embodiment.

Figure 7:
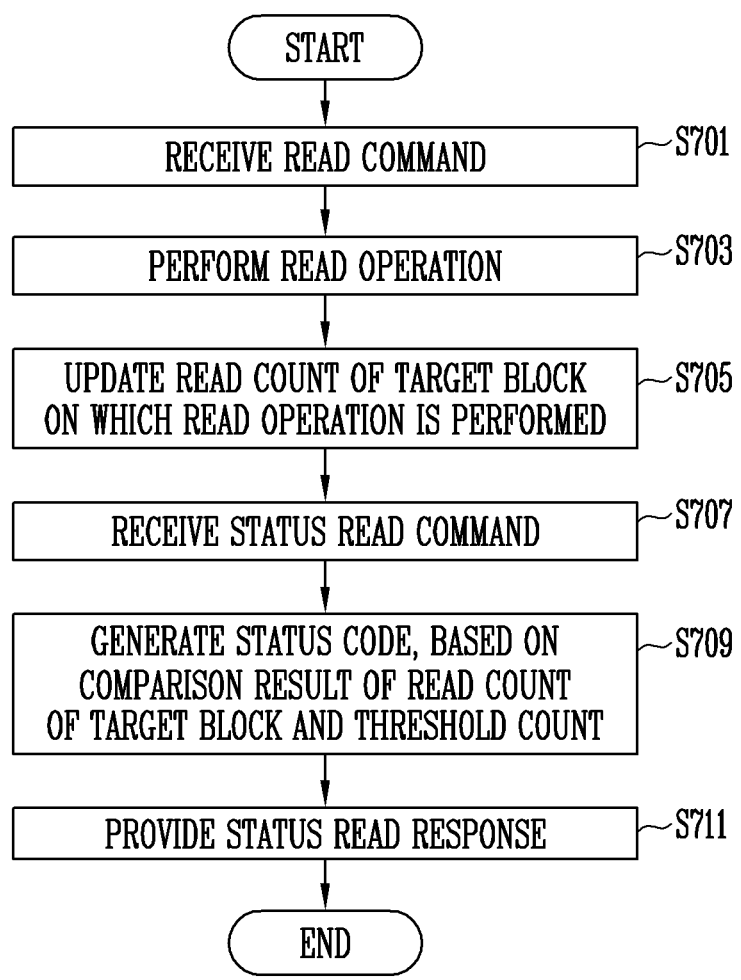
FIG. 7 is a flowchart illustrating an operation of a memory device in accordance with an embodiment of the present disclosure.

FIG. 7 is a flowchart illustrating an operation of the memory device in accordance with an embodiment of the present disclosure.

Referring to FIG. 7, in step S701, the memory device may receive a read command from the memory controller.

In step S703, the memory device may perform a read operation on a target block among a plurality of memory blocks in response to the read command. Specifically, the memory block may perform the read operation on a selected page among a plurality of pages in the target block.

In step S705, the memory device may update, i.e., increment, a read count of the target block on which the read operation is performed. Specifically, the memory device may update the read count of the target block, which is included in read count information loaded to the read count storage 132.

In step S707, the memory device may receive a status read command for checking an operating status of the memory device from the memory controller.

In step S709, the memory device may generate a status code, based on the result of a comparison of the updated read count of the target block and a threshold count. The status code may represent a priority order of a read reclaim operation on the target block with respect to other operations.

In step S711, the memory device may provide the memory controller with a status read response including the status code.

Figure 8:
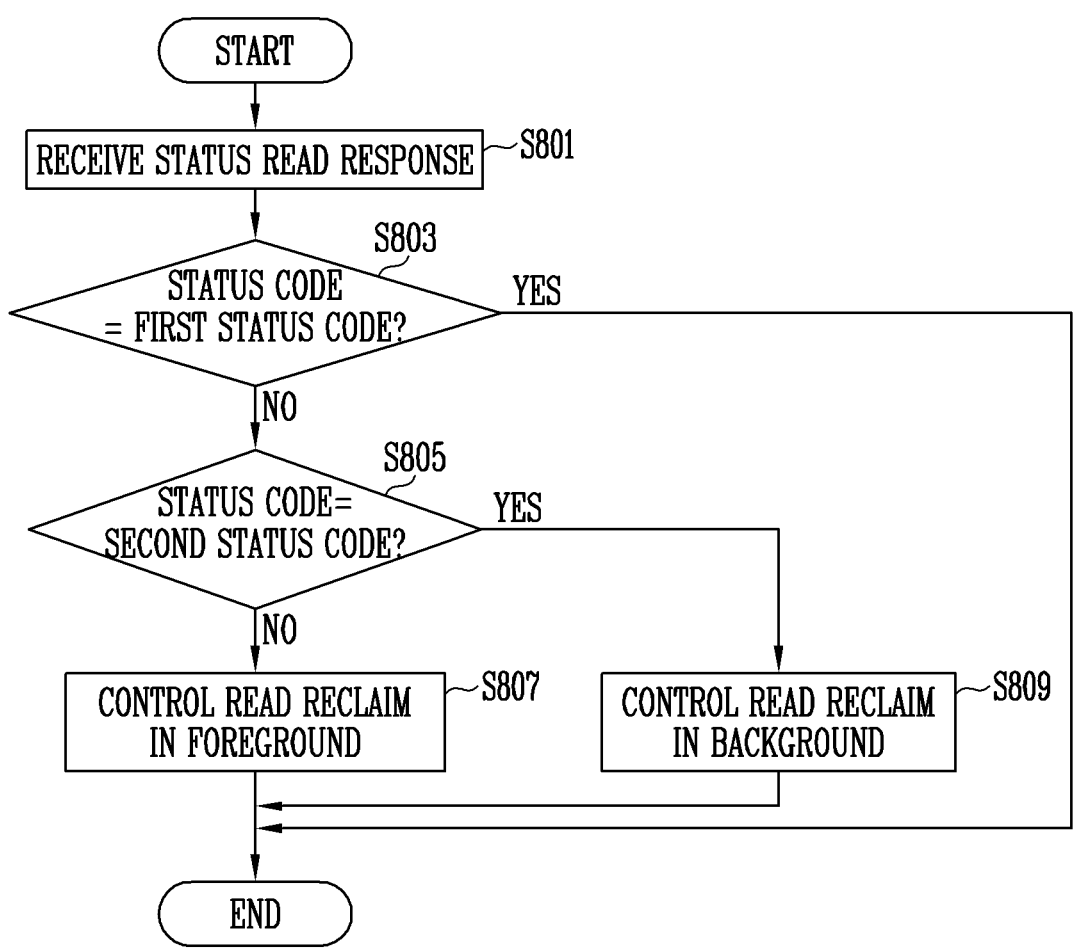
FIG. 8 is a flowchart illustrating an operation of a memory controller in accordance with an embodiment of the present disclosure.

FIG. 8 is a flowchart illustrating an operation of the memory controller in accordance with an embodiment of the present disclosure.

Referring to FIG. 8, in step S801, the memory controller may receive, from the memory device, a status read response including a status code representing a priority order of a read reclaim operation on a target block. Depending on the status code, the read reclaim operation may not be performed, may be performed as a background operation, or may be performed as a foreground operation. The embodiment of FIG. 8 assumes three status codes; however, the invention is not limited to three status codes. When a more coarse indication is acceptable, two status codes may be used. Conversely, when finer distinction is required or desired more than three status codes may be used.

In step S803, the memory controller may determine whether the status code is a first status code. When the status code is the first status code as the determined result, the memory controller ends the operation, as no read reclaim operation is necessary. When the status code is not the first status code, the memory controller proceeds to step S805.

In step S805, the memory controller may determine whether the status code is the second status code. When the status code is the second status code as a result of the comparison, the memory controller proceeds to step S809. When the status code is not the second status code (i.e., when the status code is the third status code), the memory controller proceeds to step S807.

In step S807, the memory controller may control the memory device to perform the read reclaim operation in the foreground, i.e., as a foreground operation. Specifically, the memory controller may immediately provide the memory device with commands for the read reclaim operation. The memory controller may preferentially provide the memory device the commands for the read reclaim operation, as compared with commands generated before the commands for the read reclaim operation.

In step S809, the memory controller may control the memory device to perform the read reclaim operation in the background, i.e., as a background operation. Specifically, the memory controller may generate commands for the read reclaim operation, and store the generated commands in a garbage collection queue. When the memory device is in an idle state, the memory controller may provide the memory device with the commands queued in the garbage collection queue.

In accordance with an embodiment of the present disclosure, the memory controller can determine whether a read reclaim operation on each memory block is to be performed, and if so, how such operation is to be performed, according to the status code received from the memory device. Thus, since it is unnecessary for the memory controller to separately determine whether to perform the read reclaim operation on each memory block, the burden of the memory controller, i.e., overhead, which is to determine whether the read reclaim operation is to be performed can be decreased.

In other words, since the memory device autonomously determines whether a read reclaim operation on each memory block is to be performed and provides the determined information to the memory controller, the memory controller can reduce its overhead and improve its overall operating performance by not expending system resources for determining whether the read reclaim operation on the memory block is to be performed.

Figure 9:
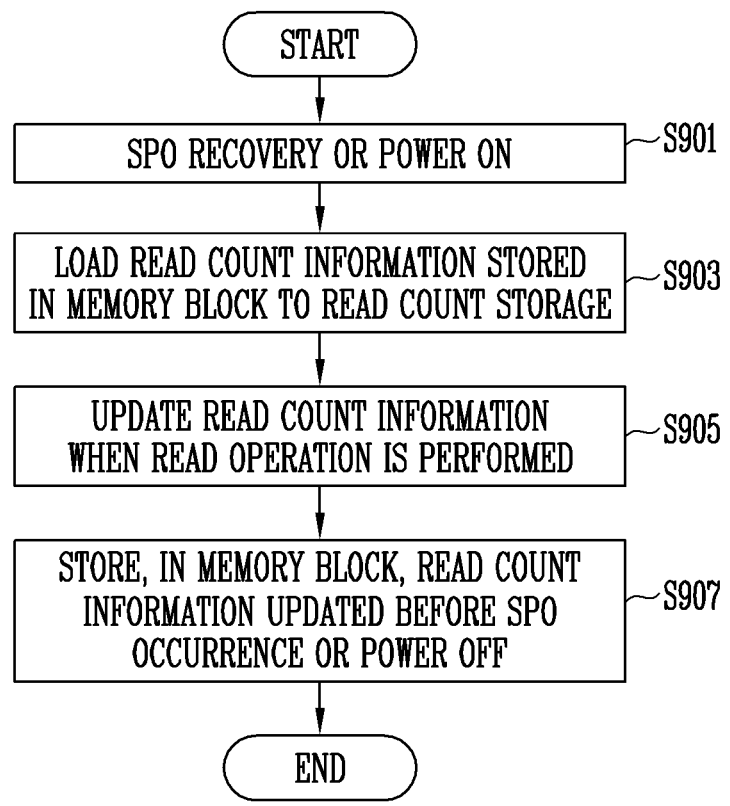
FIG. 9 is a flowchart illustrating management of read count information in accordance with an embodiment of the present disclosure.

FIG. 9 is a flowchart illustrating management of read count information in accordance with an embodiment of the present disclosure.

Referring to FIG. 9, in step S901, the memory device is in a state of recovering from a Sudden Power Off (SPO) which occurs when power of the memory device is suddenly interrupted, or the memory device may be powered on.

In step S903, the memory device may load read count information stored in memory blocks to the read count storage. The read count information may include a read count of each of a plurality of memory blocks in the memory device.

In step S905, the memory device may update the read count information for a particular memory block when a read operation is performed on that memory block. For example, the memory device may update a read count of a target block in the read count information loaded to the read count storage, in response to a read command for the target block.

In step S907, the memory device may store in the memory blocks, read count information updated before SPO or power off.

In an embodiment, the read count storage may be a volatile memory in which stored data disappears when power is interrupted. The memory block may be a nonvolatile memory block in which stored data is retained even when power is interrupted.

In accordance with an embodiment of the present disclosure, through management of the read count information as illustrated in FIG. 9, a read count of each memory block can be managed with continuity, regardless of whether power is supplied to the memory device.

In accordance with embodiments of the present disclosure, a storage device having improved read reclaim performance and an operating method thereof are provided.

While the present invention has been disclosed in the context of various embodiments thereof, it will be understood by those skilled in the art that various changes in form and details may be made therein without departing from the spirit and scope of the present disclosure as defined by the appended claims and their equivalents. Therefore, the scope of the present invention is not limited to the above-described exemplary embodiments but is determined by the appended claims including equivalents thereof.

In the above-described embodiments, not all steps, or parts thereof, necessarily need to be performed. In some instances, the order of one or more steps may be changed. The embodiments disclosed herein are only examples to facilitate an understanding of the present invention, which is not limited to or by the disclosed embodiments. That is, it should be apparent to those skilled in the art that various modifications can be made in light of the present disclosure.

Various embodiments of the present invention have been illustrated and described. Specific terminologies are used only to explain the embodiments of the present disclosure, not to limit the present invention. As will be apparent to those skilled in the art, various modifications can be made to any of the embodiments disclosed herein. The present invention encompasses all such modifications that fall within the scope of the claims.

What is claimed is:

1. A memory device comprising:
a plurality of memory blocks;
a read count storage configured to store read count information including a read count of each of the plurality of memory blocks; and
a read reclaim processor configured to:
generate a status read response which includes idle information indicating whether a target block is in an idle state and a status code representing a priority of a read reclaim operation on the target block based on the read count of each of the plurality of memory blocks; and
provide a memory controller with the status read response to generate commands for performing the read reclaim operation in response to a status read command received from the memory controller,
wherein the read reclaim operation is performed in a background or a foreground based on the idle information and the status code.

2. The memory device of claim 1, wherein the target block is a memory block, among the plurality of memory blocks, on which a read operation is performed according to a read command received from the memory controller.

3. The memory device of claim 2, wherein the read reclaim processor updates a read count of the target block, which is stored in the read count storage, in response to the read command.

4. The memory device of claim 1, wherein the read reclaim processor determines the status code, based on a result of a comparison of a read count of the target block, which is stored in the read count storage, and at least one threshold count.

5. The memory device of claim 1, wherein the status code represents one of a first status code indicating that the read reclaim operation is unnecessary, a second status code indicating that performance of the read reclaim operation is requested in a background operation, and a third status code indicating that performance of the read reclaim operation is requested in a foreground operation.

6. The memory device of claim 1, wherein the read reclaim operation is an operation of copying data stored in the target block to a memory block different from the target block among the plurality of memory blocks.

7. The memory device of claim 1, wherein the read reclaim processor stores the read count information in the plurality of memory blocks before power supplied to the memory device is interrupted, and loads the read count information stored in the plurality of memory blocks to the read count storage after the power is supplied to the memory device.

8. A method for operating a memory device including a plurality of memory blocks, the method comprising:
performing a read operation on a target block among the plurality of memory blocks in response to a read command received from a memory controller;
generating a status read response which includes idle information indicating whether the target block is in an idle state and a status code representing a priority of a read reclaim operation on the target block based on a read count of each of the plurality of memory blocks; and
providing the memory controller with the status read response to generate commands for performing the read reclaim operation in response to a status read command received from the memory controller,
wherein the read reclaim operation is performed in a background or a foreground based on the idle information and the status code.

9. The method of claim 8,
further comprising loading read count information stored in the plurality of memory blocks,
wherein the read count information includes the read count of each of the plurality of memory blocks.

10. The method of claim 9, further comprising updating a read count of the target block, which is included in the loaded read count information, in response to the read command.

11. The method of claim 9, wherein the providing of the status read response includes:
comparing a read count of the target block, which is included in the loaded read count information, with at least one threshold count; and
providing the memory controller with the status read response including the status code determined based on the comparison result.

12. The method of claim 8, wherein the status code represents one of a first status code indicating that the read reclaim operation is unnecessary, a second status code indicating that performance of the read reclaim operation is requested in a background operation, and a third status code indicating that performance of the read reclaim operation is requested in a foreground operation.

13. The method of claim 8, wherein, in the read reclaim operation, data stored in the target block is copied to a memory block different from the target block among the plurality of memory blocks.

14. A storage device comprising:
a memory device including a plurality of memory blocks; and
a memory controller configured to:
control the memory device to perform a read operation on a target block among the plurality of memory blocks, and
receive, from the memory device, a status read response which includes idle information indicating whether the target block is in an idle state and a status code representing a priority of a read reclaim operation on the target block,
wherein the memory controller determines whether the read reclaim operation is performed in a background or a foreground based on the idle information and the status code, and generates commands for performing the read reclaim operation.

15. The storage device of claim 14, wherein the memory device includes:
a read count storage configured to store read count information including a read count of each of the plurality of memory blocks; and
a read reclaim processor configured to determine the status code, based on a result of a comparison of a read count of the target block and at least one threshold count, in response to a status read command received from the memory controller.

16. The storage device of claim 14, wherein the memory controller includes a read reclaim controller configured to control the memory device to perform the read reclaim operation on the target block, based on the status code.

17. The storage device of claim 16, wherein the status code represents one of a first status code indicating that the read reclaim operation is unnecessary, a second status code indicating that performance of the read reclaim operation is requested in a background operation, and a third status code indicating that performance of the read reclaim operation is requested in a foreground operation.

18. The storage device of claim 17, wherein, when the status code is the second status code, the read reclaim controller controls the memory device to perform the read reclaim operation when the memory device is in the idle state.

19. The storage device of claim 17, wherein, when the status code is the third status code, the read reclaim controller controls the memory device to preferentially perform the read reclaim operation, as compared with another read, program or erase operation.

20. The storage device of claim 14, wherein the read reclaim operation is an operation of copying data stored in the target block to a memory block different from the target block among the plurality of memory blocks.

* * * * *